UNITED STATES PATENT OFFICE.

JACQUES DREVET, OF PARIS, FRANCE.

IMPROVEMENT IN HYDRAULIC BETONS.

Specification forming part of Letters Patent No. 126,940, dated May 21, 1872.

*To all whom it may concern:*

Be it known that I, JACQUES DREVET, of Paris, and French Republic, have invented a new Improvement in Hydraulic Beton; and I do hereby declare the following to be a full, clear, and exact description of the same.

*"An Improved Hydraulic Beton."*

The hydraulic beton which I have combined, and which I name "Béton Français," is composed of three essential agents: first, sand, (the preference being given to sea or river sand,) silex, earth, or river-mud; secondly, marine salt; and, thirdly, hydraulic cement.

The beton is prepared in the following manner: For example, six thousand six hundred and fifteen pounds avoirdupois of marine salt is dissolved in five hundred and twenty-eight pints of ordinary water, and this solution is thrown into three hundred and fifty-two pints of ordinary water. With the saline solution thus diluted, either the sand, the silex, the earth, or the river-mud is thoroughly wetted and allowed to macerate for three hours at least, in order that the sand or analogous matter shall be fully impregnated with salt-water, and that the combination should work well.

If the hydraulic beton is prepared near the sea the three hundred and fifty-two pints of common water, prepared as before described, are replaced by eighty-eight pints of sea-water.

I now take four parts of the sand thus prepared with salt or sea water, and one part of any kind of hydraulic cement, and the four parts of sand are powdered with the one part of cement, and then all is to be well mixed together. In this state the beton can be immediately used for forming blocks, stopping leaks, or for other purposes, according to the requirements of the work.

The beton thus prepared should be used in the space of thirty-four or thirty-six minutes at most, for the beton begins to set at about thirty-eight or forty minutes from the commencement of the mixing.

To unite, for example, a block of this beton at the bottom of the water, I take some hydraulic lime, which is moistened with drying oil to form it into a paste, and plaster with this paste the joint which is to be united, and then the block is allowed to descend to rest upon the bed of beton, or stone plastered with the hydraulic paste, and the joining is unalterable.

In the composition of this beton the reaction of the salt absorbs the water of crystallization from the sand, and the intimate attraction which results in connection with the hydraulic cement gives to the mixture a metallic hardness without malleability.

The mixture intended for the beton can be colored, as required, by means of mineral colors suited to the work for which it is used. This beton is applicable to hydraulic works and architectural buildings.

I claim—

The new hydraulic beton called "Béton Français," and its special combination, formed of three agents: first, sand, silex, earth, or river-mud; secondly, of marine salt; and, thirdly, of hydraulic cement, according to the exact proportions and preparation hereinbefore described.

In testimony whereof I have signed my name to this specification before two subscribing witnesses.

J. DREVET.

Witnesses:
 C. LAFOND,
 L. DAMANREZ.